(12) United States Patent
Lee et al.

(10) Patent No.: US 10,091,663 B2
(45) Date of Patent: Oct. 2, 2018

(54) METHOD AND APPARATUS FOR EXPANDING COVERAGE USING MULTI-CELL

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/556,975

(22) PCT Filed: Feb. 3, 2016

(86) PCT No.: PCT/KR2016/001200
§ 371 (c)(1),
(2) Date: Sep. 8, 2017

(87) PCT Pub. No.: WO2016/148396
PCT Pub. Date: Sep. 22, 2016

(65) Prior Publication Data
US 2018/0054743 A1    Feb. 22, 2018

Related U.S. Application Data

(60) Provisional application No. 62/133,475, filed on Mar. 16, 2015.

(51) Int. Cl.
*H04W 40/00* (2009.01)
*H04W 16/26* (2009.01)
(Continued)

(52) U.S. Cl.
CPC .......... *H04W 16/26* (2013.01); *H04W 16/32* (2013.01); *H04W 4/005* (2013.01); *H04W 4/70* (2018.02); *H04W 88/02* (2013.01)

(58) Field of Classification Search
CPC ..... H04W 24/00; H04W 24/02; H04W 28/16; H04W 28/18; H04W 28/24; H04W 28/04;
(Continued)

(56) References Cited

U.S. PATENT DOCUMENTS

2014/0098761 A1    4/2014 Lee et al.
2015/0173102 A1*   6/2015 Ruiz Delgado ....... H04L 1/1864
                                                              370/280
(Continued)

FOREIGN PATENT DOCUMENTS

WO    WO 2014/069944 A1    5/2014

OTHER PUBLICATIONS

Alcatel-Lucent, Alcatel-Lucent Shanghai Bell, "Options for LC-MTC UE SIB Transmission", R2-150467, 3GPP TSG-RAN WG2 Meeting #89, Athens, Greece, Jan. 31, 2015, 7 pages.
(Continued)

Primary Examiner — Temica M Beamer
(74) Attorney, Agent, or Firm — Birch, Stewart, Kolasch & Birch, LLP

(57) ABSTRACT

Provided are a method for expanding a coverage using multiple serving cells in a wireless communication system and an apparatus for supporting the same. A terminal may receive, at least one time, setting information which indicates multiple serving cells to be combined from among the multiple serving cells, and receive repetitively messages in the multiple serving cells to be combined on the basis of the received setting information. Moreover, the terminal may combine the messages which are repetitively received in the multiple serving cells to be combined, on the basis of the received setting information.

13 Claims, 12 Drawing Sheets

(51) Int. Cl.
*H04W 16/32* (2009.01)
*H04W 4/00* (2018.01)
*H04W 88/02* (2009.01)
*H04W 4/70* (2018.01)

(58) Field of Classification Search
CPC ... H04W 72/04; H04W 72/082; H04W 76/02; H04W 16/18; H04W 16/24; H04W 16/02; H04W 16/10; H04W 16/14
USPC ...................................... 455/446, 450, 452.1
See application file for complete search history.

(56) References Cited

U.S. PATENT DOCUMENTS

| | | | |
|---|---|---|---|
| 2015/0208415 A1* | 7/2015 | Xu ........................ | H04L 5/001 370/329 |
| 2015/0271755 A1* | 9/2015 | Karri ................. | H04W 52/0229 370/252 |
| 2015/0296518 A1 | 10/2015 | Yi et al. | |
| 2016/0219595 A1* | 7/2016 | Larsson ................ | H04L 5/001 |
| 2016/0262186 A1* | 9/2016 | Lee ......................... | H04L 1/00 |

OTHER PUBLICATIONS

Huawei, Hisilicon, "SIB for Rel-13 low complexity MTC", R2-150256, 3GPP TSG-RAN WG2 Meeting #89, Athens, Greece, Jan. 31, 2015, 9 pages.
Samsung, "SIBs for Rel-13 MTC", R2-150414, 3GPP TSG-RAN WG2 Meeting #89, Athens, Greece, Jan. 31, 2015, 7 pages.

* cited by examiner

METHOD AND APPARATUS FOR EXPANDING COVERAGE USING MULTI-CELL

CROSS REFERENCE TO RELATED APPLICATIONS

This application is the National Phase of PCT International Application No. PCT/KR2016/001200, filed on Feb. 3, 2016, which claims priority under 35U.S.C. 119(e) to U.S. Provisional Application No. 62/133,475, filed on Mar. 16, 2015, all of which are hereby expressly incorporated by reference into the present application.

BACKGROUND OF THE INVENTION

Field of the Invention

The present invention relates to a wireless communication system, and more particularly, to a method for performing coverage enhancement, by a UE, using multiple cells, and an apparatus supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

In order to meet data rate requirements established by the ITU for IMT-Advanced, transmission and reception using a wide bandwidth is necessary. Therefore, a target bandwidth of 100 MHz, which is much wider than a maximum bandwidth of 20 MHz provided by 3GPP Release 8 and is supportable by LTE-Advanced, is set. However, due to the lack of spectrum resources in a low frequency range, it is not easy to contiguously allocate a 100-MHz bandwidth for a mobile wireless network. Accordingly, carrier aggregation (CA) has been introduced. As the name indicates, CA is a technique for simultaneously using multiple aggregated carriers, in which the multiple carriers may provide and occupy a wide transmission bandwidth of up to 100 MHz at the same time.

Since a cell includes a downlink carrier and an uplink carrier, CA is known as cell aggregation. In CA, a user equipment (UE) may form one basic cell as a PCell and may form up to four auxiliary cells as SCells. A PCell performs basic control, such as RRC connection management, radio bearer management, mobility management, and security management. An SCell controls the amount of traffic by adding or removing radio resources for a UE.

SUMMARY OF THE INVENTION

Generally, a repetitive transmission method may be used for coverage enhancement. However, repetitive transmission for successful transmission and reception may require a considerable amount of radio resources. That is, a current UE combines a plurality of repetitions received from one cell on a particular frequency, which may cause excessive loads to the particular frequency. Accordingly, in order to solve such a problem, the present invention proposes a coverage enhancement method using multiple cells, and a device supporting the same.

According to one embodiment, there is provided a method for enhancing coverage using a plurality of serving cell in a wireless communication system. A UE may receive configuration information indicating a plurality of serving cells to be aggregated among the plurality of serving cells at least once; and may repeatedly receive a message in the plurality of serving cells to be aggregated based on the received configuration information.

In addition, the UE may aggregate the configuration information received a plurality of times. The configuration information may include identification information on a serving cell that transmits the configuration information.

The configuration information may be received from the plurality of serving cells or from a PCell among the plurality of serving cells.

Further, the UE may aggregate the message repeatedly received in the plurality of serving cells to be aggregated based on the received configuration information.

The configuration information may include resource location information on the message repeatedly received in the plurality of serving cells to be aggregated, and the resource location information may be any one of radio frame information, subframe information, and radio resource block information. The resource location information may be indicated with a bitmap.

The configuration information may include repetition number information or repetition period information on the message repeatedly received in the plurality of serving cells to be aggregated. The repetition number information or the repetition period information may be set to be different for each of the plurality of serving cells to be aggregated.

The configuration information may include offset information for starting to aggregate the message repeatedly received in the plurality of serving cells to be aggregated.

The configuration information may include information indicating whether the repeatedly received message is received in the plurality of serving cells to be aggregated.

The configuration information may include information indicating whether the configuration information is information for repeatedly receiving the message in the plurality of serving cells to be aggregated.

The configuration information may include at least one of identification information on a bearer on which the message is received and identification information on a cell in which the message is received.

According to another embodiment, there is provided a method for enhancing coverage using a plurality of serving cells in a wireless communication system. The UE may receive configuration information indicating a plurality of serving cells to be aggregated among the plurality of serving cells at least once and may repeatedly transmit a message in the plurality of serving cells to be aggregated based on the received configuration information.

According to another embodiment, there is provided a UE enhancing coverage using a plurality of serving cells in a wireless communication system. The UE may include: a memory; a transceiver; and a processor to connect the memory and the transceiver, and the processor may be configured to: control the transceiver to receive configuration information indicating a plurality of serving cells to be aggregated among the plurality of serving cells at least once; and repeatedly receive a message in the plurality of serving cells to be aggregated based on the received configuration information.

The same message is repeatedly transmitted and received using multiple cells, thereby reducing loads that occur intensively on a particular frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
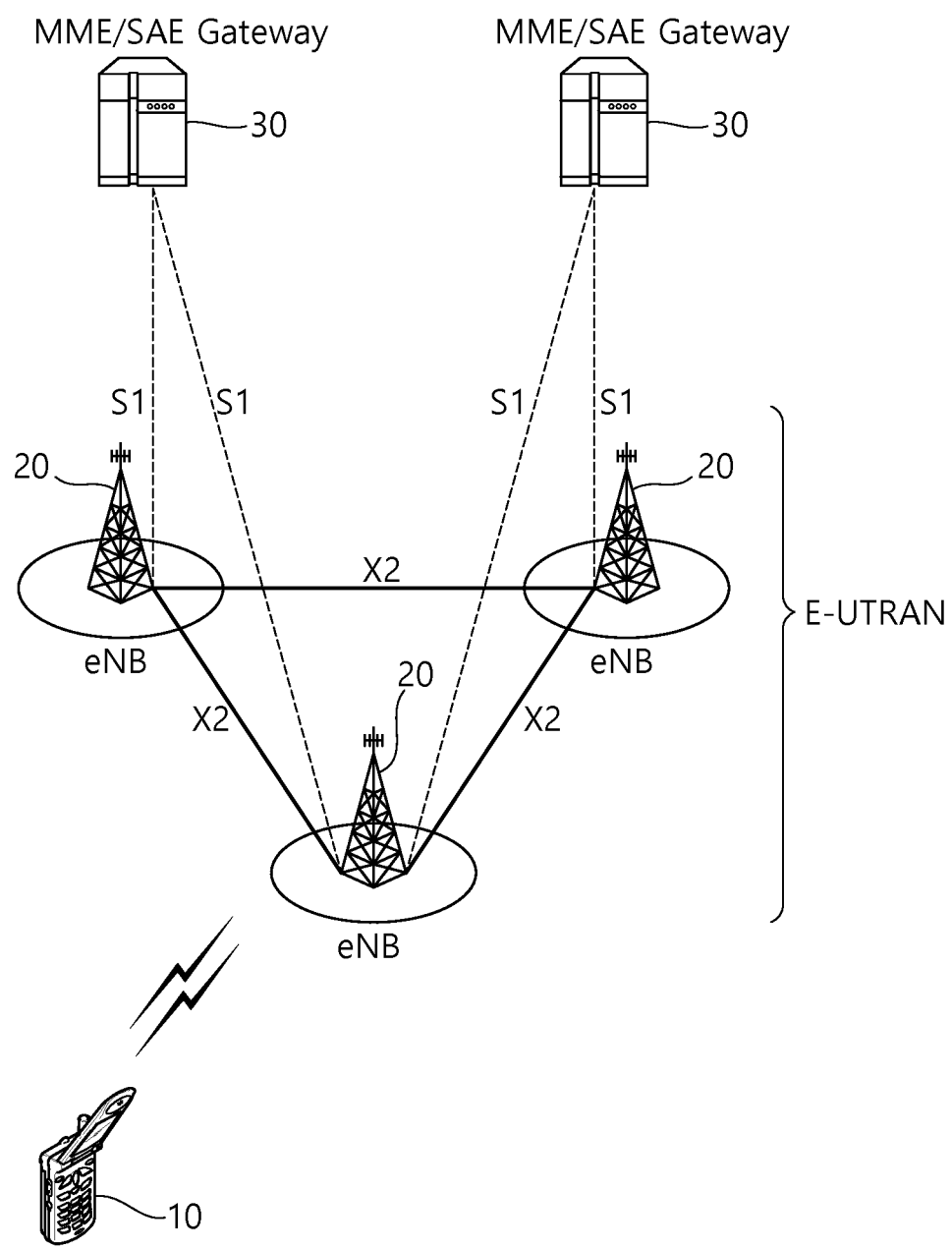
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
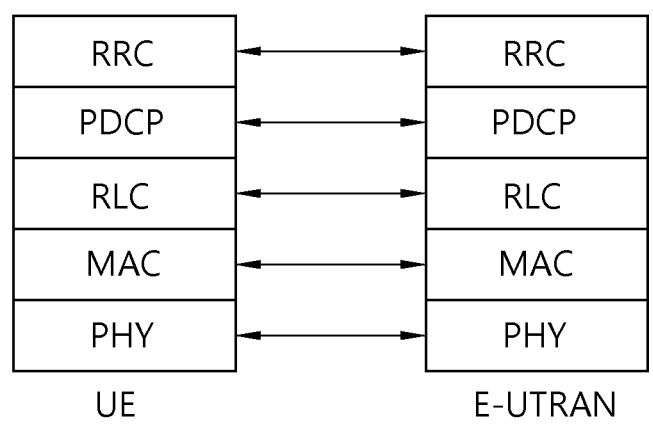
FIG. 2 shows a control plane of a radio interface protocol of an LTE system.
Figure 3:
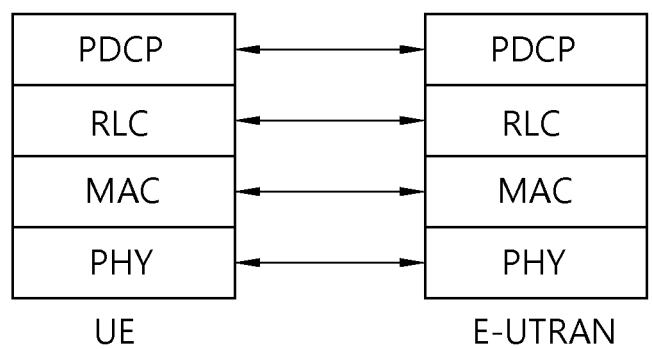
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
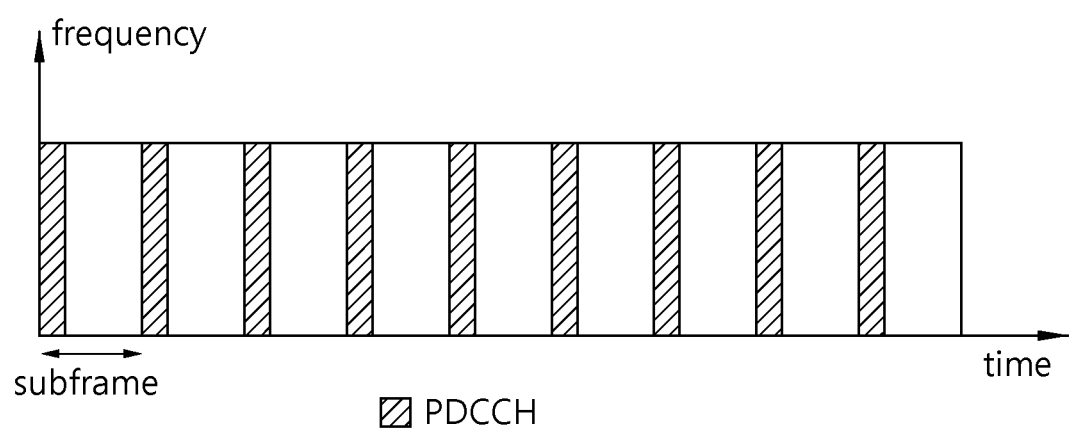
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/ multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, a carrier aggregation (CA) system will be described.

Figure 5:
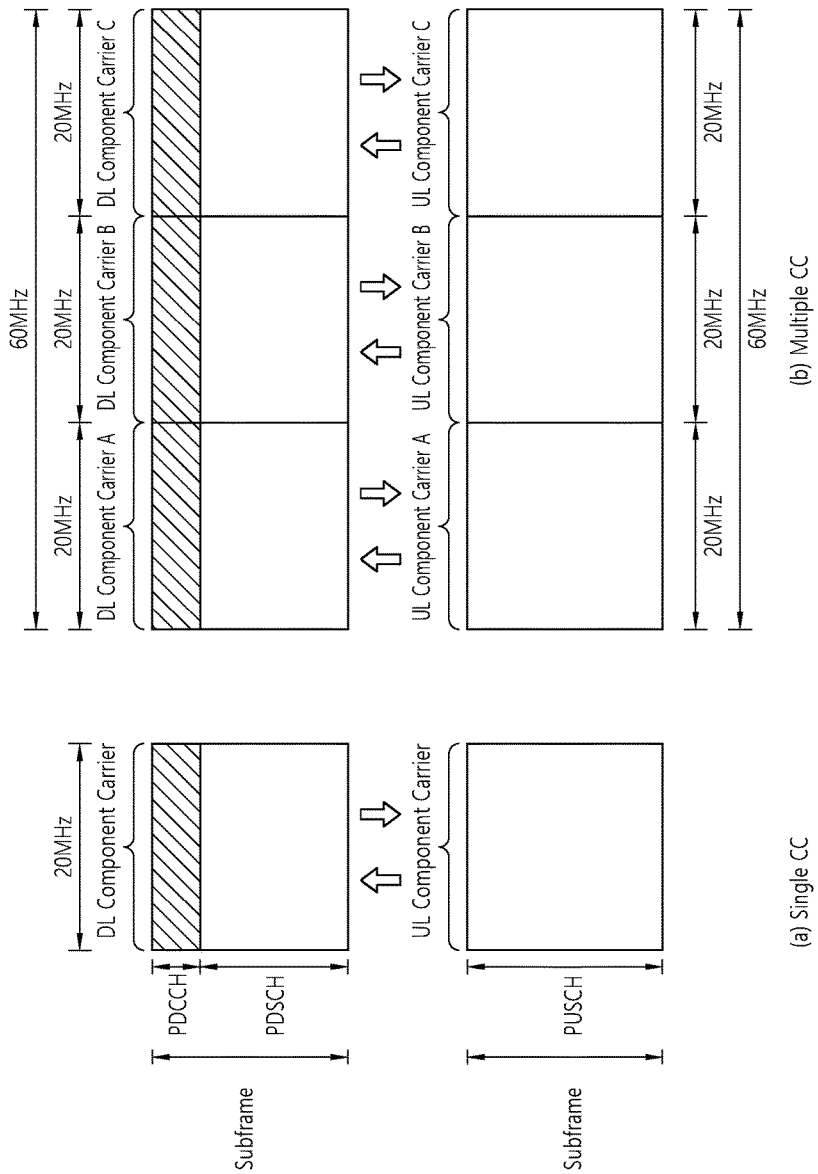
FIG. 5 shows a legacy single-carrier system and a carrier aggregation system.

FIG. 5 shows a legacy single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell. In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure. The secondary cell implies a cell which operates at a secondary frequency, and is configured when an RRC connection is once established and is used to provide an additional radio resource.

The serving cell is formed of a primary cell in the case of a UE in which a Carrier Aggregation (CA) has not been configured or to which a CA cannot be provided. If a CA has been configured for a UE, the term 'serving cell' is used to indicate a primary cell and one of all secondary cells or a set of a plurality of secondary cells. That is, a primary cell means one serving cell which provides security inputs and NAS mobility information in an RRC establishment or re-establishment state. At least one cell may be configured to form a set of serving cells along with a primary cell depending on the capabilities of UE. The at least one cell is called a secondary cell. Accordingly, a set of serving cells configured for one UE may be formed of only one primary cell or may be formed of one primary cell and at least one secondary cell.

A primary component carrier (PCC) denotes a CC corresponding to the primary cell. The PCC is a CC that establishes an initial connection (or RRC connection) with a BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode.

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state.

A downlink CC corresponding to the primary cell is called a downlink primary component carrier (DL PCC), and an uplink CC corresponding to the primary cell is called an uplink primary component carrier (UL PCC). A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC. Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

Hereinafter, machine-type communication (MTC) will be described.

Figure 6:
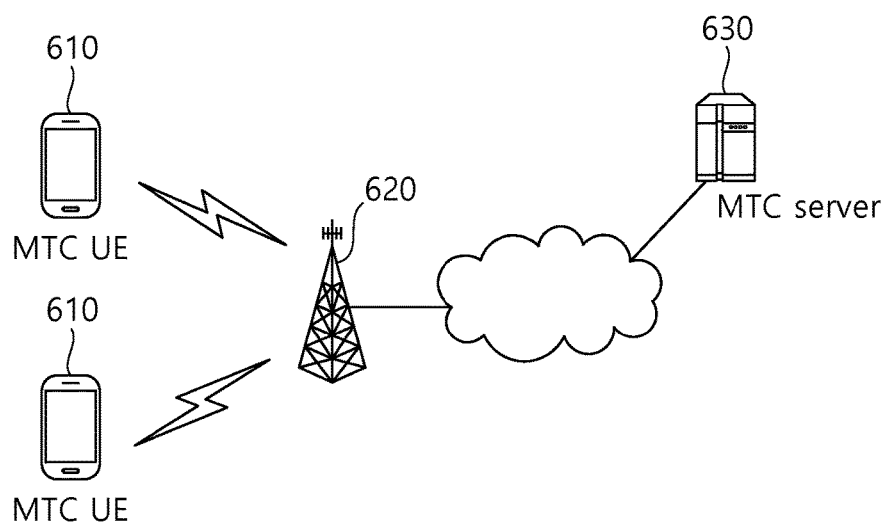
FIG. 6 shows an example of MTC.

FIG. 6 shows an example of MTC.

MTC refers to information exchange between MTC UEs 610 via a BS 620 without involving human interactions or information exchanges between an MTC UE 610 and an MTC server 630 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 630 is an entity communicating with the MTC UE 610. The MTC server 630 runs an MTC application and provides an MTC-specific service to an MTC device. The MTC UE 610 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table I shows 3GPP UE categories.

TABLE 1

| UE Category | DL speed | UL speed |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |

TABLE 1-continued

| UE Category | DL speed | UL speed |
| --- | --- | --- |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Figure 7:
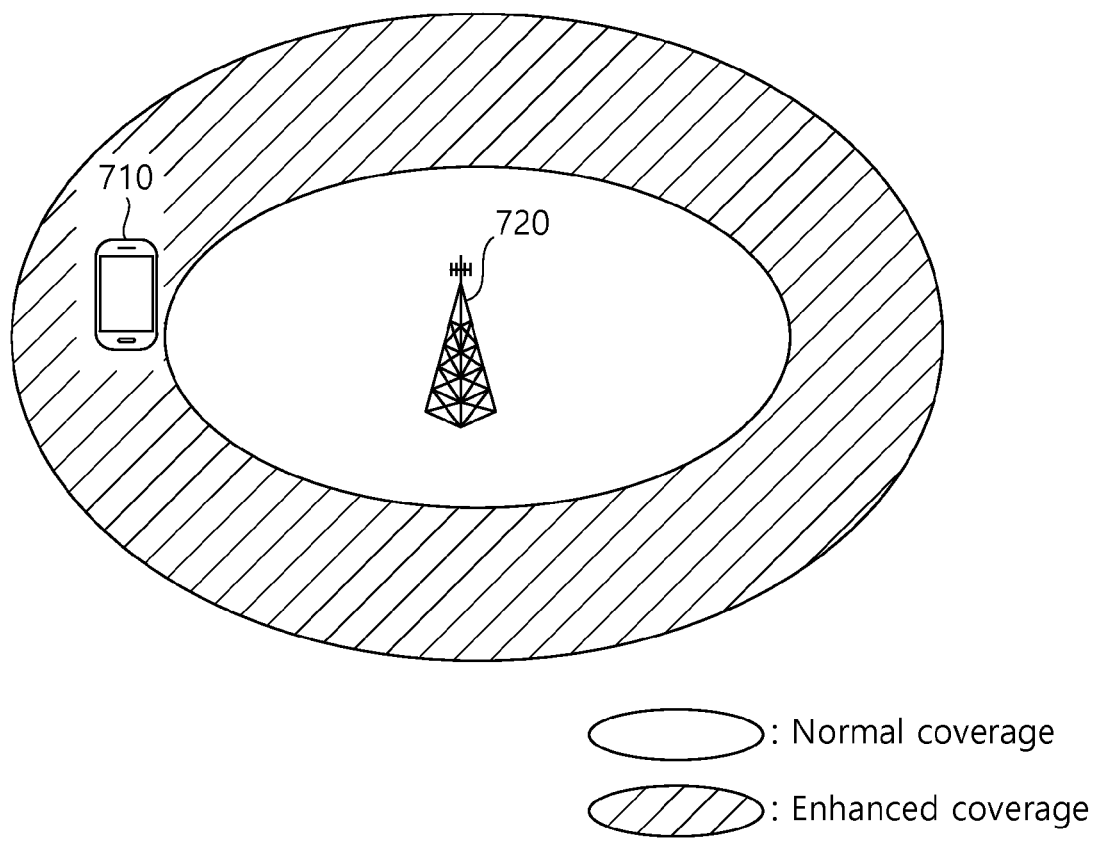
FIG. 7 shows an example of cell coverage enhancement for an MTC device.

FIG. 7 shows an example of cell coverage enhancement for an MTC device.

As described above, various coverage enhancement techniques, such as a repetitive transmission method for an MTC UE by each channel/signal, have recently been under discussion.

Coverage enhancement techniques may be needed not only for an MTC UE but also for a normal UE depending on the location of a UE in a cell and the signal quality of the UE in the cell. Generally, a repetitive transmission method may be used as a coverage enhancement technique. The number of repetitions required for successful transmission and reception may vary depending on the scenario and UE capabilities. For example, an MTC UE according to Release 13 may have approximately 150 repetitions with respect to a 328-bit SIB in extended coverage. A significant amount of radio resources may be needed to support repetitive transmission for successful transmission and reception. That is, a current UE combines a plurality of repetitions received from one cell on a particular frequency, which causes excessive loads to the particular frequency. Accordingly, in order to solve such a problem, the present invention proposes a coverage enhancement method using multiple cells. In the present invention, multiple cells refer to a plurality of cells which is subjected to carrier aggregation.

Hereinafter, a coverage enhancement method using multiple cells according to an embodiment of the present invention will be described in detail. In the present invention, the coverage enhancement method may be applied to a normal terminal and may also be applied to an MTC UE.

To reduce loads on a particular frequency that occur due to repetitive transmission for coverage enhancement, a method of utilizing a plurality of frequencies for repetitive transmission is proposed. In downlink reception, a UE with frequency aggregation capability may repeatedly receive a specific message on a plurality of frequencies and may combine the repeatedly received specific messages to decode the message. In uplink transmission, a UE with frequency aggregation capability may transmit the same message on a plurality of frequencies.

Configuration information may be provided from a PCell or in each serving cell. Alternatively, some configuration information may be provided from one serving cell and the remaining configuration information may be provided from another serving cell. The configuration information is configuration/scheduling information related to the repetitive transmission/reception of the same message by a UE over a plurality of frequencies. The configuration information may include the following pieces of information.

Information on repeated resource location (radio frame, subframe, and radio resource block) for a message on each frequency (cell) to be combined for uplink transmission and downlink reception: The resource location may be fixed within a set period. Alternatively, the resource location may be fixed within a predefined period of time. Alternatively, the resource location may be described with a bitmap.

Information on the number of repetitions (resources) on each frequency or information on the duration of repetitions (resources) on each frequency: The number or the duration may be different for each frequency. A common number or common duration for all frequencies to be aggregated may be set.

Information on an offset for starting data to be aggregated for each cell: This offset may mean a period between the end time of a configuration (subframe) and the start time (subframe) of data to be aggregated. Alternatively, the offset may mean a period between the start time (subframe) of a configuration and the start time (subframe) of data to be aggregated. The offset may be provided for each cell to be aggregated. A common offset may be provided for all cells to be aggregated.

Information on a predefined fixed offset

In downlink reception, information indicating whether or not a message is repeatedly received over a plurality of frequencies In uplink transmission, information indicating whether or not a message is repeatedly transmitted over a plurality of frequencies Information indicating whether or not the configuration information is information for repeatedly transmitting/receiving a message through a plurality of cells Information on an identifier of a bearer on which data to be aggregated is received Information on an identifier of a cell with which the configuration information is associated Information on an identifier of a cell in which data to be aggregated is received: Among set cells including a PCell, one or more cells may be aggregated.

Based on the configuration information, a UE may aggregate messages repeatedly received from an indicated cell on an indicated resource location. The messages may be any RRC message (for example, a system information block) or user plane data.

The configuration information may be provided to the UE through dedicated signaling in an MAC, RRC, or PHY layer.

The configuration information may be applied to uplink transmission and downlink reception.

Figure 8:
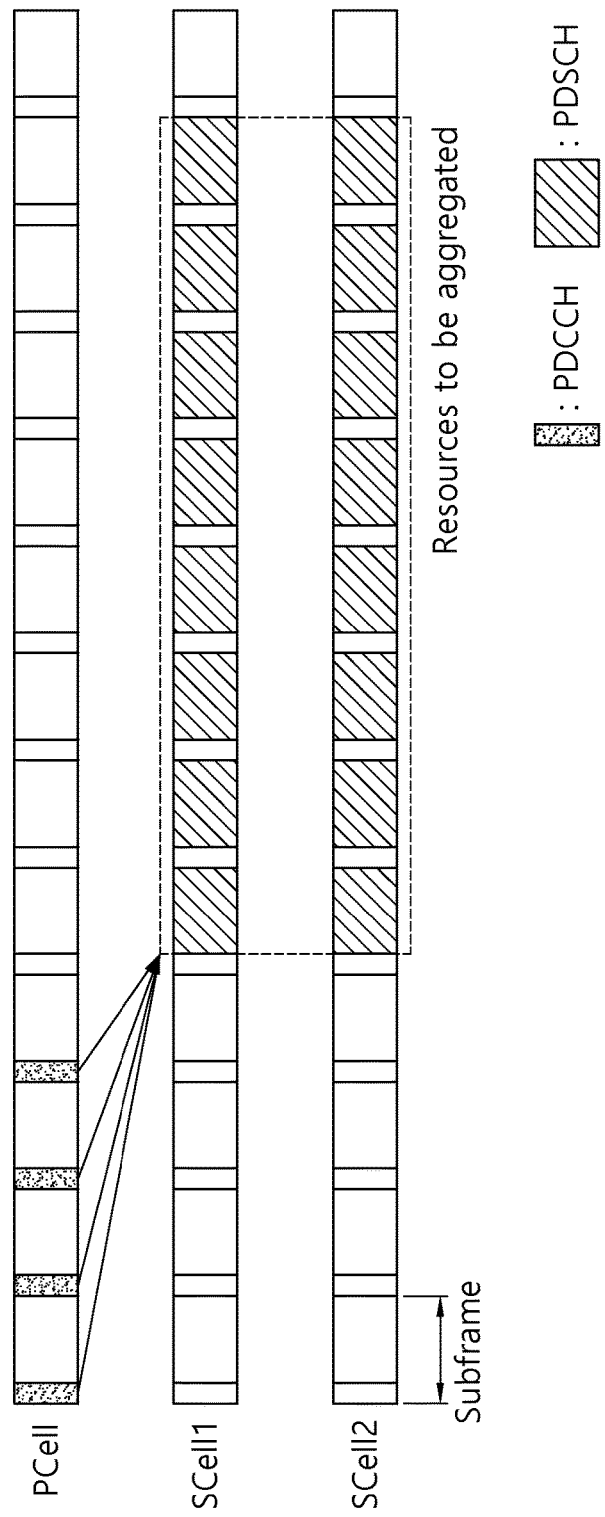
FIG. 8 illustrates an example of a method for receiving a message using multiple cells according to an embodiment of the present invention.
Figure 9:
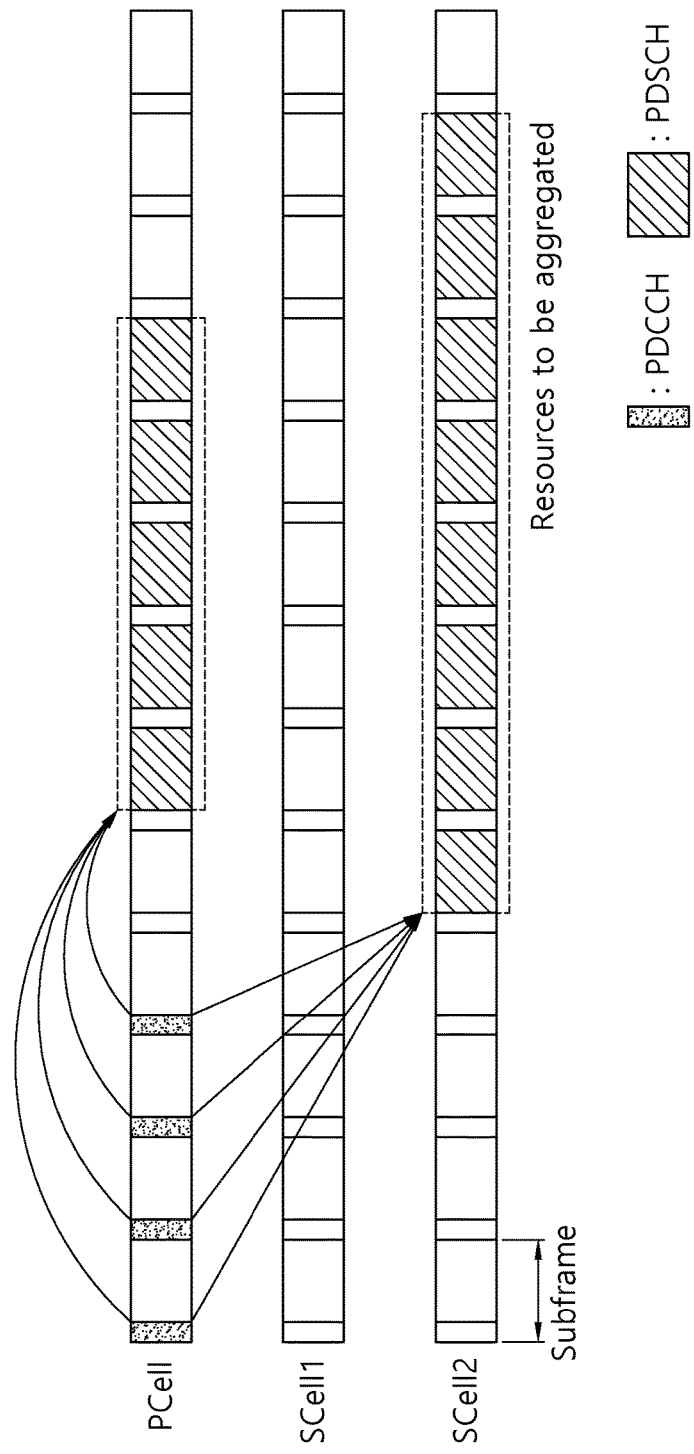
FIG. 9 illustrates another example of a method for receiving a message using multiple cells according to an embodiment of the present invention.

Hereinafter, the present invention will be described in detail with reference to embodiments of a coverage enhancement method using multiple cells illustrated in FIGS. 8 and 9. FIGS. 8 and 9 show a PCell and two SCells, which are provided for illustrative purposes, but the present invention is not limited to this configuration.

FIG. 8 illustrates an example of a method for receiving a message using multiple cells according to an embodiment of the present invention. Referring to FIG. 8, it is assumed that the same message is repeated the same number of times from different cells.

Step 1: PCell may set resources to be aggregated in SCell1 and SCell2. PCell may indicate to a UE that SCell1 and SCell2 are to be aggregated. PCell may indicate to the UE the location of the resources to be aggregated in each subframe. PCell may indicate to the UE the bitmap of the subframes to be aggregated. In the embodiment of FIG. 8, it is assumed that the resources to be aggregated by PCell are fifth to twelfth subframes of SCell and SCell2.

Step 2: First, the UE may aggregate configuration messages/signaling to obtain configuration information on PCell. The configuration information on PCell may be indicated to the UE through a fixed location of the configuration messages/signaling. In the embodiment of FIG. 8, it is assumed that the UE acquires the configuration information on PCell by aggregating PDCCHs of first to fourth subframes.

Step 3: In a subframe/resource indicated by the configuration information on PCell, the UE may aggregate messages received from SCell1 and SCell2.

The embodiment of FIG. 8 may also be applied to uplink transmission. That is, the UE may be configured with uplink transmission resources for transmitting a message across a plurality of frequencies.

FIG. 9 illustrates another example of a method for receiving a message using multiple cells according to an embodiment of the present invention. Referring to FIG. 9, it is assumed that the same message is repeated different numbers of times from different cells. In the embodiment of FIG. 9, it is assumed that the same message is repeated through PCell and SCell2 and the start location of the repetition and the number of repetitions are different in each cell. The start location of the repetition and the number of repetitions are merely an embodiment and the present invention is not limited thereto.

Step 1: PCell may set resources to be aggregated in PCell and SCell2. PCell may indicate to a UE that PCell and SCell2 are to be aggregated. With respect to each of PCell and SCell2, PCell may indicate to the UE the location of the resources to be aggregated in each subframe. With respect to PCell and SCell2, PCell may indicate to the UE the bitmap of the subframes to be aggregated. In the embodiment of FIG. 9, it is assumed that the resources to be aggregated by the PCell is sixth to tenth subframes of PCell and fifth to twelfth subframes of SCell2.

Step 2: First, the UE may aggregate messages/signaling to obtain configuration information on PCell. The configuration information on PCell may be indicated to the UE through a fixed location of the configuration messages/signaling. In the embodiment of FIG. 9, it is assumed that the UE acquires the configuration information on PCell by aggregating PDCCHs of first to fourth subframes.

Step 3: In a subframe/resource indicated by the configuration information on PCell, the UE may aggregate messages received from PCell and SCell2.

The embodiment of FIG. 9 may also be applied to uplink transmission. That is, the UE may be configured with uplink transmission resources for transmitting a message across a plurality of frequencies.

Figure 10:
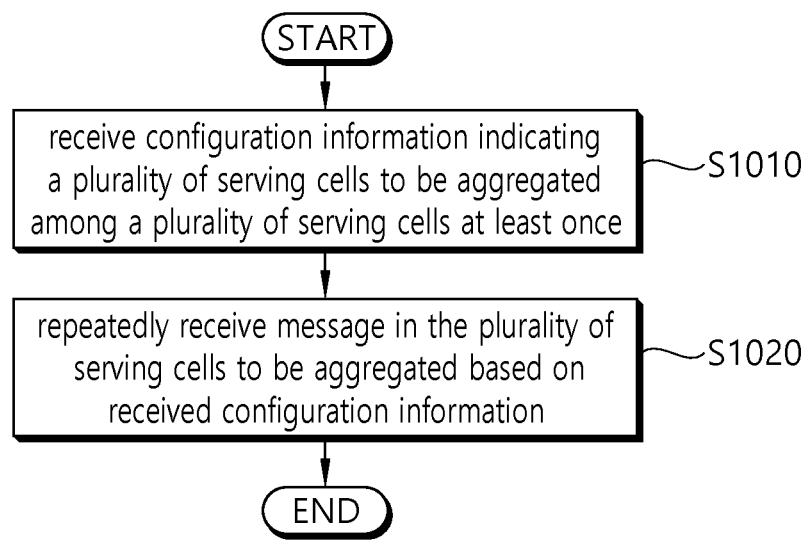
FIG. 10 is a block diagram illustrating a method in which a UE receives a message using multiple cells according to an embodiment of the present invention.

FIG. 10 is a block diagram illustrating a method in which a UE receives a message using multiple cells according to an embodiment of the present invention.

The UE may receive configuration information indicating a plurality of serving cells to be aggregated among a plurality of serving cells at least once (S1010). The configuration information may be received from the plurality of serving cells. Alternatively, the configuration information may be received from a PCell among the plurality of serving cells. When the configuration information is received a plurality of times, the UE may aggregate the configuration information received the plurality of times. The configuration information may include identification information on a serving cell that transmits the configuration information.

The UE may repeatedly receive a message in the plurality of serving cells to be aggregated based on the received configuration information (S1020).

The configuration information may include resource location information on the messages repeatedly received in the plurality of serving cells to be aggregated. The resource location information may be any one of radio frame information, subframe information, and radio resource block information. The resource location information may be fixed within a predefined period or a set period. The resource location information may be indicated with a bitmap.

The configuration information may include repetition number information or repetition period information on the messages repeatedly received in the plurality of serving cells to be aggregated. The repetition number information or the repetition period information may be set to be different for each of the plurality of serving cells to be aggregated or may be set to be the same for the serving cells. Common repetition number information or common repetition period information may be set for the plurality of serving cells to be aggregated.

The configuration information may include offset information for starting to aggregate the messages repeatedly received in the plurality of serving cells to be aggregated. The offset may be a period between the end time of a configuration (subframe) and the start time (subframe) of data to be aggregated. Alternatively, the offset may be a period between the start time (subframe) of a configuration and the start time (subframe) of data to be aggregated. The offset information may be provided from each of the plurality of serving cells to be aggregated. A common offset for the plurality of serving cells to be aggregated among the offset information may be provided from all serving cells to be aggregated.

The configuration information may include information indicating whether the repeatedly received messages are received in the plurality of serving cells to be aggregated.

The configuration information may include information indicating whether the configuration information is information for repeatedly receiving the messages in the plurality of serving cells to be aggregated.

The configuration information may include identification information on a bearer on which the messages are received.

The configuration information may include identification information on a cell in which the messages are received.

Further, the UE may aggregate the repeatedly received messages from the plurality of serving cells to be aggregated based on the received configuration information.

Figure 11:
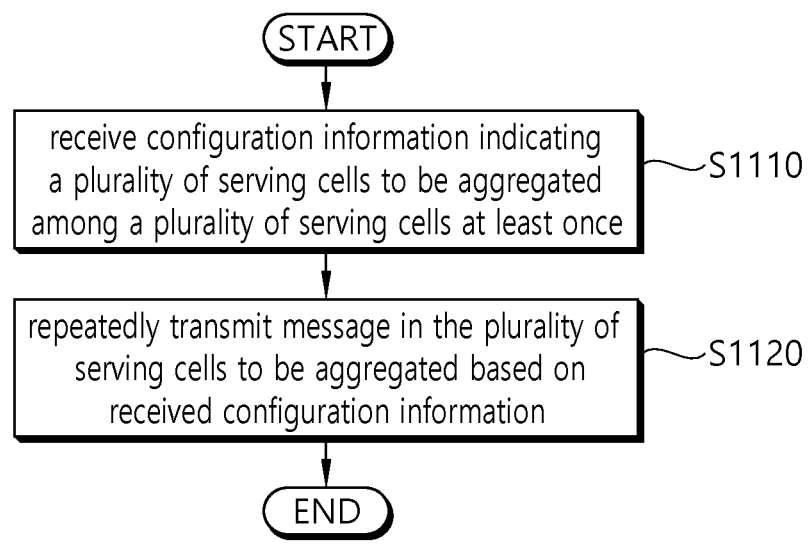
FIG. 11 is a block diagram illustrating a method in which a UE transmits a message using multiple cells according to an embodiment of the present invention.

FIG. 11 is a block diagram illustrating a method in which a UE transmits a message using multiple cells according to an embodiment of the present invention.

The UE may receive configuration information indicating a plurality of serving cells to be aggregated among a plurality of serving cells at least once (S1110). The configuration information may be received from the plurality of serving cells. Alternatively, the configuration information may be received from a PCell among the plurality of serving cells. When the configuration information is received a plurality of times, the UE may aggregate the configuration information received the plurality of times. The configuration information may include identification information on a serving cell that transmits the configuration information.

The UE may repeatedly transmit a message in the plurality of serving cells to be aggregated based on the received configuration information (S1120).

The configuration information may include resource location information on the messages repeatedly transmitted in the plurality of serving cells to be aggregated. The resource location information may be any one of radio frame information, subframe information, and radio resource block information. The resource location information may be fixed within a predefined period or a set period. The resource location information may be indicated with a bitmap.

The configuration information may include repetition number information or repetition period information on the messages repeatedly transmitted in the plurality of serving cells to be aggregated. The repetition number information or the repetition period information may be set to be different for each of the plurality of serving cells to be aggregated or may be set to be the same for the serving cells. Common repetition number information or common repetition period information may be set for the plurality of serving cells to be aggregated.

The configuration information may include offset information for starting to aggregate the messages repeatedly transmitted in the plurality of serving cells to be aggregated. The offset may be a period between the end time of a configuration (subframe) and the start time (subframe) of data to be aggregated. Alternatively, the offset may be a period between the start time (subframe) of a configuration and the start time (subframe) of data to be aggregated. The offset information may be provided from each of the plurality of serving cells to be aggregated. A common offset for the plurality of serving cells to be aggregated among the offset information may be provided from all serving cells to be aggregated.

The configuration information may include information indicating whether the repeatedly transmitted messages are transmitted in the plurality of serving cells to be aggregated.

The configuration information may include information indicating whether the configuration information is information for repeatedly transmitting the messages in the plurality of serving cells to be aggregated.

The configuration information may include identification information on a bearer on which the messages are received.

The configuration information may include identification information on a cell in which the messages are received.

Figure 12:
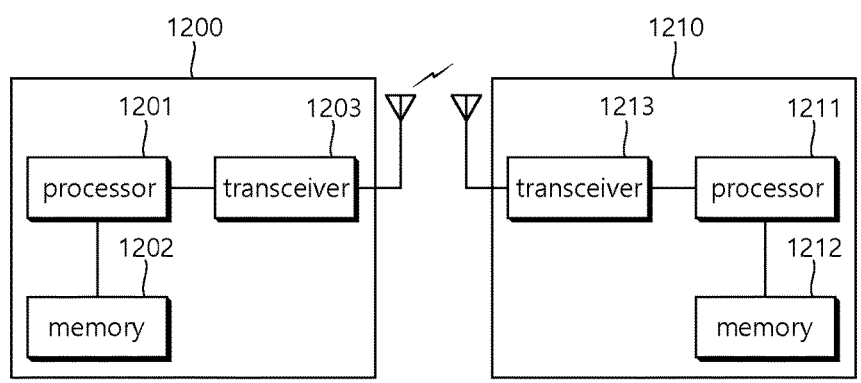
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for enhancing coverage, by a user equipment (UE), using a plurality of serving cells in a wireless communication system, the method comprising:
receiving, from at least one cell among the plurality of serving cells, configuration information including:
information indicating that a message is repeatedly received across a plurality of cells,
the plurality of cells in which the message is repeatedly received, among the plurality of serving cells, and
a resource location for message on each of the plurality of cells;

receiving, from the plurality of cells on the resource location, the message repeatedly based on the received configuration information; and decoding the message by combining the repeatedly received message from the plurality of cells on the resource location, wherein the resource location is least one of a radio frame, a subframe or a radio resource block.

2. The method of claim 1, further comprising;

combining the configuration information received a plurality of times; and acquiring the configuration information, by combining the configuration information received the plurality of times.

3. The method of claim 1, wherein the configuration information includes identification information on the least one cell that transmits the configuration information.

4. The method of claim 1, wherein the at least one cell is a primary cell (PCell).

5. The method of claim 1, wherein the at least one cell is multiple cells among the plurality of serving cells.

6. The method of claim 1, wherein the resource location is indicated with a bitmap.

7. The method of claim 1, wherein the configuration information further includes repetition number information or repetition period information for the message repeatedly received from the plurality of cells.

8. The method of claim 7, wherein the repetition number information or the repetition period information is set to be different for each of the plurality of cells.

9. The method of claim 1, wherein the configuration information further includes offset information for starting to combine the message repeatedly received from the plurality of cells.

10. The method of claim 1, wherein the configuration information further includes information indicating whether the configuration information is information for repeatedly receiving the message from the plurality of cells.

11. The method of claim 1, wherein the configuration information further includes at least one of identification information on a bearer on which the message is received and identification information on the plurality on cells on which the message is received.

12. A method for enhancing coverage, by a user equipment (UE), using a plurality of serving cells in a wireless communication system, the method comprising;

receiving, from at least one cell among the plurality of serving cells, configuration information including;
information indicating that a message is repeatedly transmitted across a plurality of cells,
the plurality of cells in which the message is repeatedly transmitted, among the plurality of serving cells, and
a resource location for the message on each of the plurality of cells; and transmitting, to the plurality of cells on the resource location, the message repeatedly based on the received configuration information, wherein the resource location is at least one of a radio frame, a subframe or a radio resource block.

13. A user equipment (UE) for enhancing coverage using a plurality of serving cells in a wireless communication system, the UE comprising:

a memory;

a transceiver; and a processor, connected with the memory and the transceiver, that;

control the transceiver to receive, from at least one cell among the plurality of serving cells, configuration information including:
information indicating that a message is repeatedly received across a plurality of cells,
the plurality of cells in which the message is repeatedly received, among the plurality of serving cells, and
a resource location for the message on each of the plurality of cells;

controls the transceiver to receive, from the plurality of cell on the resource location, the message repeatedly based on the received configuration information; and decodes the message by combining the repeatedly received message from the plurality of cells on the resource location, wherein the resource location is at least one of a radio frame, a subframe or a radio resource block.

* * * * *